US011663702B2

(12) United States Patent
Gadgil et al.

(10) Patent No.: US 11,663,702 B2
(45) Date of Patent: May 30, 2023

(54) IMAGE DEBANDING USING ADAPTIVE SPARSE FILTERING

(71) Applicant: Dolby Laboratories Licensing Corporation, San Francisco, CA (US)

(72) Inventors: Neeraj J. Gadgil, San Jose, CA (US); Qing Song, Sunnyvale, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 152 days.

(21) Appl. No.: 17/415,674

(22) PCT Filed: Dec. 10, 2019

(86) PCT No.: PCT/US2019/065457
§ 371 (c)(1),
(2) Date: Jun. 17, 2021

(87) PCT Pub. No.: WO2020/131494
PCT Pub. Date: Jun. 25, 2020

(65) Prior Publication Data
US 2022/0076384 A1    Mar. 10, 2022

Related U.S. Application Data

(60) Provisional application No. 62/781,754, filed on Dec. 19, 2018.

(30) Foreign Application Priority Data

Dec. 19, 2018   (EP) .................................... 18214110

(51) Int. Cl.
G06T 5/00     (2006.01)
H04N 19/86    (2014.01)
G06T 5/20     (2006.01)

(52) U.S. Cl.
CPC ................ *G06T 5/002* (2013.01); *G06T 5/20* (2013.01); *H04N 19/86* (2014.11); *G06T 2207/20012* (2013.01)

(58) Field of Classification Search
CPC . G06T 5/002; G06T 5/20; G06T 2207/20012; H04N 19/86
See application file for complete search history.

(56) References Cited

U.S. PATENT DOCUMENTS 6,823,089 B1   11/2004   Yu
8,055,095 B2   11/2011   Palotai
(Continued)

FOREIGN PATENT DOCUMENTS

EP    0838940 B1    12/2005
JP    2003304400 A  10/2003
(Continued)

OTHER PUBLICATIONS

Song, Qing, Guan-Ming Su, and Pamela C. Cosman. "Hardware-efficient debanding and visual enhancement filter for inverse tone mapped high dynamic range images and videos." 2016 IEEE International Conference on Image Processing (ICIP). IEEE, 2016. (Year: 2016).*

(Continued)

*Primary Examiner* — Andrae S Allison

(57) ABSTRACT

Methods and systems for reducing banding artifacts when displaying images are described. Identified image bands are filtered using an adaptive sparse finite response filter, where the tap-distance in the sparse filter is adapted according to an estimated width of each image band. Image debanding may be performed across multiple pixel orientations, such as rows, columns, a 45-degree angle, or a −45-degree angle.

(Continued)

Given a threshold to decide whether sparse filtering needs to be performed or not, an iterative debanding process is also proposed.

20 Claims, 5 Drawing Sheets

(56) References Cited

U.S. PATENT DOCUMENTS

| | | | |
|---|---|---|---|
| 8,300,802 | B2 | 10/2012 | Deng |
| 8,606,009 | B2 | 12/2013 | Sun |
| 8,908,989 | B2 | 12/2014 | Geisler |
| 9,747,514 | B2 | 8/2017 | Lim |
| 9,858,502 | B2 | 1/2018 | Moody |
| 9,961,316 | B2 | 5/2018 | Tan |
| 10,129,565 | B2 | 11/2018 | Monnier |
| 10,130,325 | B2 | 11/2018 | Launay |
| 10,924,695 | B2* | 2/2021 | Lee .................. G06T 5/20 |
| 2006/0269159 | A1 | 11/2006 | Kim |
| 2007/0286515 | A1 | 12/2007 | Kim |
| 2010/0128803 | A1 | 5/2010 | Divorra Escoda |
| 2010/0135575 | A1 | 6/2010 | Guo |
| 2010/0239182 | A1 | 9/2010 | Basu |
| 2013/0148029 | A1 | 6/2013 | Gish |
| 2015/0092847 | A1* | 4/2015 | Su .................. H04N 19/33 |
| | | | 375/240.12 |
| 2015/0117793 | A1 | 4/2015 | Deng |
| 2016/0021391 | A1* | 1/2016 | Su .................. H04N 19/30 |
| | | | 375/240.12 |
| 2016/0125579 | A1* | 5/2016 | Song .................. G06T 5/008 |
| | | | 382/261 |
| 2017/0347126 | A1* | 11/2017 | Shoa Hassani Lashdan ............. |
| | | | H04N 19/182 |
| 2018/0041759 | A1* | 2/2018 | Froehlich ............. H04N 19/182 |
| 2018/0130169 | A1 | 5/2018 | Falkenstern |
| 2018/0192062 | A1* | 7/2018 | Su .................. H04N 19/33 |
| 2018/0268526 | A1 | 9/2018 | Mentl |
| 2021/0092461 | A1 | 3/2021 | Gadgil |
| 2021/0150680 | A1 | 5/2021 | Gadgil |
| 2021/0279839 | A1* | 9/2021 | Ko .................. G06T 5/20 |
| 2021/0321142 | A1* | 10/2021 | Lin .................. H04N 19/40 |
| 2021/0350505 | A1* | 11/2021 | Lee .................. G06T 7/90 |

FOREIGN PATENT DOCUMENTS

| | | |
|---|---|---|
| WO | 2014143253 A1 | 9/2014 |
| WO | 2020033573 | 2/2020 |

OTHER PUBLICATIONS

Gadgil, Neeraj J., Qing Song, and Guan-Ming Su. "Image Debanding Using Iterative Adaptive Sparse Filtering." Electronic Imaging Oct. 2020 (2020): 178-1. (Year: 2020).*

Baugh, G. et al "Advanced Video Debanding" ACM Visual media, Nov. 13, 2014, pp. 1-10.

Song, Q. et al "Hardware-Efficient Debanding and Visual Enhancement Filter for Inverse Tone Mapped High Dynamic Range Images and Videos" IEEE International Conference on Image Processing, Sep. 25, 2016, pp. 3299-3303.

* cited by examiner

IMAGE DEBANDING USING ADAPTIVE SPARSE FILTERING

TECHNOLOGY

The present invention relates generally to images. More particularly, an embodiment of the present invention relates to reducing banding artifacts in images using adaptive sparse filtering.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

As used herein, the term "banding" (also referred to as "color banding") refers to a visual artifact in imaging and video where shades of the same color are displayed as bands of varying luminance. When visible, banding is visually annoying and is often considered an indicator of low-quality encoding or of a low-quality display. As appreciated by the inventors here, improved techniques for reducing banding when displaying video content, especially HDR content, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
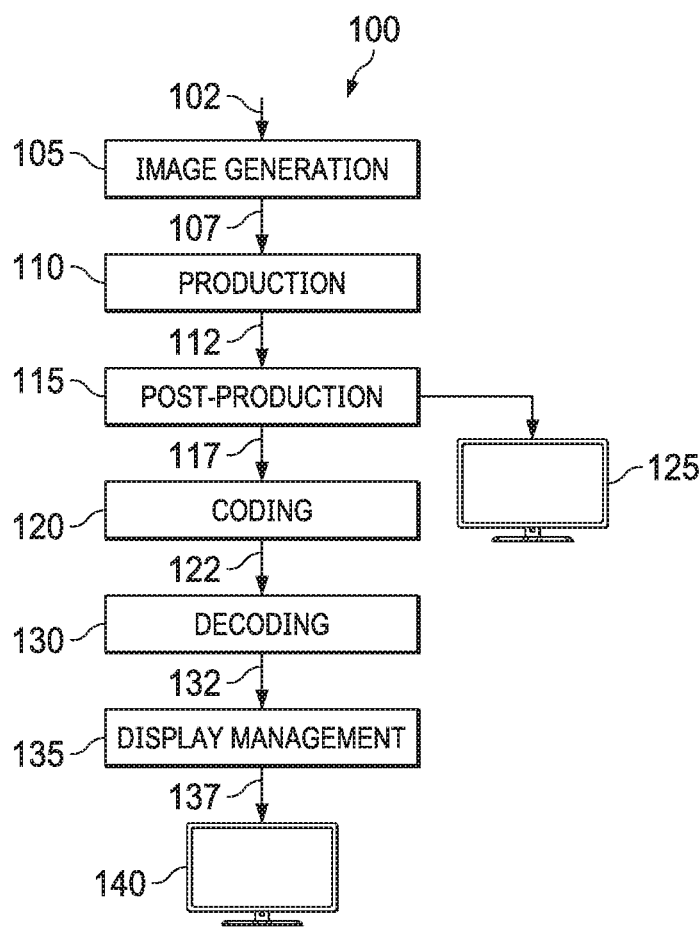
FIG. 1 depicts an example process for a video delivery pipeline.

Reducing banding artifacts in image and video content by using adaptive sparse filtering is described herein. Given an input image with banding artifacts, parameters of one or more adaptive sparse filters are adjusted according to the properties of the bands in the input image before the filters are applied to the image. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to a method for reducing banding artifacts in images and video sequences. The method may be implemented in an encoder or in a decoder.

In an embodiment, an encoder or a decoder receives an input image comprising pixel values and optionally a filtering decision threshold. It identifies one or more sequence of pixels having the same pixel value between a starting position and an end position in a one dimensional pixel array of the input image, to generate corresponding one or more image bands. The one-dimensional pixel array based on the pixel values of the input image and a pixel orientation (e.g., across rows, columns, or diagonals). It analyzes the pixel values in the one-dimensional pixel array to identify one or more image bands, wherein each identified image band is characterized by a width of the band and a band pixel value. The width of the band is defined as a number of pixels of the same value between the starting position and ending position For each image band in the one or more image bands, the encoder or decoder determines, for a sparse filter, a tap-distance parameter, indicating a number of consecutive pixels between a pixel of a tap of the sparse filter and a pixel of another tap, as function of the width of the image band. The encoder or decoder may apply the sparse filter with the determined tap-distance parameter to the image band. The sparse filter is applied to the image band to generate output filtered pixel values. The encoder or decoder generates an output image based on the output filtered pixel values.

In other words, for an image band among the identified image bands, the method determines a tap-distance parameter for an adaptive sparse filter based on the width of the image band, and it applies the adaptive sparse filter with the tap-distance parameter to the pixel values of the image band to generate output filtered pixel values. Then, it generates an output image based on the output filtered pixel values.

In an embodiment, the tap-distance parameter is determined between a pixel of a center-tap and a pixel of a neighboring tap.

In an embodiment, the number of taps of the sparse filter is predetermined.

In an embodiment, the determined tap-distance parameter is directly proportional to the width of the image band.

In an embodiment, the tap-distance parameter is decreasing with increasing the predetermined number of taps.

In an embodiment, applying the filter with the tap-distance parameter to a pixel of the image band comprises averaging the pixel values of the corresponding taps of the sparse filter over the predetermined number of taps.

In an embodiment, the averaging excludes the pixel values of boundary taps located at boundaries with neighboring image bands. The two taps at the edges of the filter are neglected in computing the average.

In an embodiment, the method further comprises receiving a filtering decision threshold, and further, for each image band, computing a plurality of differences between a pixel value of the center tap and each pixel value of the other taps, computing the absolute maximum of the differences. In this embodiment, the sparse filter is applied to the image band based on a comparison between the filtering decision threshold and the absolute maximum.

In an embodiment, the sparse filter is applied to the image band if the tap-distance parameter does not exceed the filtering decision threshold.

In an embodiment, the sparse filter is not applied to the image band if the tap-distance parameter exceeds the filtering decision threshold, so as that the pixels remain unfiltered.

In an embodiment, identifying one or more sequence of pixels having the same pixel value in the one-dimensional pixel array comprises sampling pixels values of a color component of the input image across one of: a row of the input image, a column of the input image, a 45-degrees diagonal direction of the input image, or a −45 degrees diagonal direction of the input image.

In an embodiment, the method for reducing banding artifacts is performed across columns of the input image to generate a first output image. The method for reducing banding artifacts may be performed across rows of the first output image to generate a second output image.

In an embodiment, the method for reducing band artifacts may be performed across a 45-degrees diagonal of the second output image to generate a third output image and the method for reducing banding artifacts may be performed across a −45-degrees diagonal of the third output image to generate a fourth output image.

In an embodiment, the method may further comprise computing an image distance metric between the input image and the output image according to an image-distance criterion; comparing the image distance metric with a continuation threshold, and if the image distance metric is larger than the continuation threshold, then decreasing the filtering decision threshold to generate a second filtering decision threshold; and using the second filtering decision threshold to filter the output according to the method of any of claims 1-13 to generate a second output image; else outputting the output image.

Example Video Delivery Pipeline

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

The video data (107) may include SDR or HDR content, including enhanced SDR (SDR+) content, as well as image metadata that may be used by recipient devices downstream in the video delivery pipeline (100) to perform image processing operations on a decoded version of the SDR video contents. Example SDR video contents may, but are not necessarily limited to only, be SDR+ video contents, SDR images, SDR movie releases, SDR+ images, SDR media programs, etc.

As used herein, the term enhanced SDR or "SDR+" denotes a combination of SDR image data and metadata, which when combined together allow generating corresponding high dynamic range (HDR) image data. SDR+ image metadata may include composer data to generate backward reshaping mappings which when applied to an input SDR image generate a corresponding HDR image. SDR+ images allow backwards compatibility with legacy SDR displays which can ignore the SDR+ image metadata and simply display the SDR image.

Banding is a major visual artifact that is exhibited in the form of visible "bands" in a displayed or printed image. In video, such bands often change with time, thus creating significant annoyance to viewers. Banding in images is often a result of poor image-capture, poor compression or transcoding, or using ineffective and/or insufficient post-processing techniques. In banding, a first set of consecutive pixels tends to have a first same pixel value, defining a "band. This set is followed by a second set of pixel values having a second same pixel value. This pattern exhibits as bands in the image. In removing banding artifacts (to also be referred herein as "debanding,"), the challenge is to reduce or remove banding artifacts while preserving the real edges of the image. Image debanding may be performed as both a pre-processing step (e.g., before coding (120), as part of post-production (115) or as part of other pre-processing) or as a post processing step (e.g., after decoding (130), as part of display management (135) or as part of other post processing).

Example System for Reducing Banding Artifacts

Figure 2:
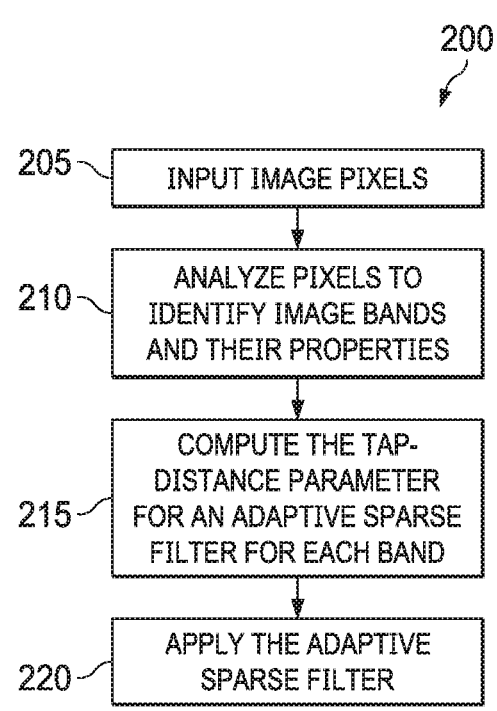
FIG. 2 depicts an example process for reducing banding artifacts according to an embodiment of this invention.

FIG. 2 depicts an example data flow (200) for reducing banding artifacts according to an embodiment. As depicted in FIG. 2, given a set of image pixels (205), typically stored in an image buffer, step 210 analyzes the image pixels to determine the properties characterizing the banding artifacts, e.g., the position, pixel value, and width of each band. In an embodiment, a sequence of consecutive pixels in a one-dimensional pixel array is identified as a band if all pixel values between a starting point and an end point in the one-dimensional pixel array have the same pixel value. Mathematically, this can be expressed as:

for $k=b_j^{start}, b_j^{start}+1, b_j^{start}+2, \ldots, b_j^{end}, s(k)=\alpha_j;$ $s(b_j^{start}-1) \neq \alpha_j;$ and $s(b_j^{end}+1) \neq \alpha_j,$ where s(k) denotes the pixel value in the k-th position of the one-dimensional pixel array, $b_j^{start}$ denotes the start of the j-th image band, $b_j^{end}$ denotes the end of the j-th band, and $\alpha_j$ denotes the band's pixel value.

Given the computed properties of the detected banding, step 215 generates the parameters of an adaptive, sparse, filter (ASF), such as the pixel span, in number of pixels, of the taps of the sparse filter. A sparse filter span (or size) may be defined as the number of pixels between the boundary taps. Finally, in step 220, the adaptive sparse filter is applied to the input pixel data to generate an output image with reduced banding artifacts. Filtering may be applied across pixel values in rows, columns, or angles of the image (e.g., at 45 and −45 degrees, or any other sampling orientation).

In an embodiment, sparse finite input response (FIR) filtering, as described herein, may be defined in an example expression as:

$$s'(k) = \sum_{i=-u}^{u} w_i s(k+d[i]), \qquad (1)$$

where $w_i$ is the i-th filter coefficient, s(k) denotes the k-th pixel value of the input signal, s'(k) denotes the corresponding output filtered pixel value, d[i] denotes the tap-distance (in pixels) for the i-th tap, and 2u+1 denotes the number of filter taps, i.e. the number of filter terms of equations 1. In an embodiment, the tap-distance d[i] refers to the distance, in number of pixels, from the central pixel tap.

When the sparse filter is applied to the input image, the filter may be convolved with the input image. The convolution of the image and the sparse filter represents the so-called filtered image.

In an embodiment, d[i]=i*q, for i=−u+1 to u−1, d[u]=(u−1)*q+e, and d[−u]=(−u+1)*q−e, where q and e denote again filtering distance parameters. In an embodiment, $$e = \frac{q-1}{2},$$

if q is an odd number, and $$e = \frac{q}{2},$$

if q is an even number. Filtering coefficients in equation (1) are typically representing a smoothing low pass filter, such as an averaging filter and the like.

In some embodiments, in taps i=−u and i=u, $w_i=0$; however, as explained below, input samples in these taps are used to compute pixel differences and help decide whether to smooth or not the center pixel (s(k)). This allows for improved robustness to edge and texture preservation at the boundaries of the filter. That is, the boundary taps allow better preservation of thick edges. For example, let $$D_k^{(i)} = s(k) - s(k+d[i]), \text{ for } i=-u \text{ to } u, \qquad (2)$$

denote the difference between the center-tap input pixel value (s(k)) and input pixel values in each of the remaining filter taps, and let $$D_k^{(max)} = \max(|D_k^{(i)}|), \text{ for } i=-u \text{ to } u, \qquad (3)$$

then, in an embodiment, filtering is performed only if $D_k^{(max)} \leq Th$, where Th denotes a filtering-decision threshold (e.g., Th=16). For example, without loss of generality, a 7-tap (e.g., u=3), conditional, adaptive sparse filter is described as follows:

if $(D_k^{(max)} \leq Th)$ $s'[k]=(s[k-2q]+s[k-q]+s[k]+s[k+q]+s[k+2q])/5$ else $s'[k]=s[k] \qquad (4)$ thus, $w_i=0$, for i=3 and −3, and $w_i=\frac{1}{5}$, for i=−2 to 2, denoting a sparse, averaging finite impulse response (FIR) filter. Computing $D_k^{(max)}$ and comparing it with the threshold Th may be characterized as an edge-detection operation, where if an edge is detected, sparse filtering is skipped. Thus, Th may also be referred to as an edge detection threshold. Other embodiments may replace the conditional sparse filtering execution presented herein by other edge-detections algorithms known by those skilled in the art.

From equation (4), the filter output depends on the sparse-filtering distance parameter q, indicating a number of consecutive pixels between neighboring taps. For images with wide bands, one typically needs a larger q to remove these bands; however, if q is increased too much, then parts of the image tend to get over-smoothed, which is also undesirable. So, it is necessary to select q adaptively based on local pixel parameters. In experiments using test images with banding, using $$q = m \frac{W}{(2u-1)}, \quad (5)$$

where W is the width of bands in the image and m is a positive integer constant (e.g., m=2), but not a multiple of 2u−1, yields the best results. For example, without loss of generality, for the 7-tap filter (u=3) of equation (4), the distance (q) between neighboring samples in the sparse filters is a multiple of $$m * \left(\frac{W}{5}\right).$$

In an embodiment, the distance parameter q is adjusted adaptively based on the local pixel properties, such as the estimate of the width of the banding (W). For a 7-tap filter, experimental results suggest that m values between 1 and 4 work the best.

Since s'[k] of equation (4), the filtered center-pixel, depends on the tap-distance parameter q, which is a function of the width of the image band, the pixels in the same image band will be filtered by a sparse filter with the same value of q, i.e. with a sparse filter of the same span (or size). Pixels of different image bands will be filtered by sparse filters with different values of q, i.w. with sparse filter of different spans (or size).

Returning to FIG. 2, step 210 comprises a pixel-analysis step to identify pixel properties, such as W, the width of a band. In an embodiment, a "band" is defined as a group of neighboring pixels having the same pixel value. Consider N pixel groups (or image bands), each of which has a start and an end pixel index to indicate the location of the band, the pixel value (e.g. luma codeword) of the group, and the number of pixels or width W of the band. Let $(b_j^{start}, b_j^{end})$ be the start and end pixel indices and let $\alpha_j$ be the pixel value of all pixels belonging to j-th band of the pixel buffer (205). Then, the number of pixels in the j-th band is given by $$n_j = b_j^{end} - b_j^{start} + 1. \quad (6)$$

In an embodiment, one may merge two bands of the same band pixel values but separated by a band of very close pixel values or stray pixels, into a single band. For example, three consecutive bands (denoted as bands j, j+1, and j+2) may be merged if:

The number of pixels in the second band (j+1) is smaller than a threshold; this takes into consideration stray pixels within a band; and The α values of bands j and j+1 are within a threshold; that is, the stray pixel values in band j+1 should have values close to the dominant pixel value in the j-th band; and The α values of bands j and j+2 are the same. That is, if the pixel values in bands j and j+2 are different (that is, $\alpha_j \neq \alpha_{j+2}$), then bands j and j+1 are not merged These three conditions may be expressed as: one may merge the j, (j+1), and (j+2) bands into a single band, if $$n_{j+1} n_{tol}, |\alpha_j - \alpha_{j+1}| \leq \alpha_{tol}, \text{ and } \alpha_j = \alpha_{j+2}, \quad (7)$$

where $n_{tol}$ and $\alpha_{tol}$ are thresholds. When the three bands are merged into one band, say, band j, then $$b_j^{start} = b_j^{start}; \ b_j^{end} = b_{j+2}^{end}; \ n_j = n_j + n_{j+1} + n_{j+2},$$

the subsequent bands (e.g., the k-th band, for k>j+2) are renumbered, and newly formed band j and the subsequent bands are analyzed again for potential merging opportunities.

For example, in an embodiment, for high-definition (e.g. 1080p), original, 10-bit SDR images, for displays in the 48-65 inches (diagonal) range, $n_{tol}=5$, $\alpha_{tol}=1$. For images converted from 8-bits to 10 bits, one may use $\alpha_{tol}=2^{(10-8)}=4$, to allow for one, 8-bit codeword tolerance. One way to generate such images is by a left bit-shift of the 8-bit data at each pixel, to generate a 10-bit pixel value with two trailing 0 bits. This makes the difference between adjacent codewords to be $2^{(10-8)}=4$. For HDR images, one can define $\alpha_{tol}$ as a function (e.g., min, max, or average) of the distances between two adjacent HDR codewords.

Figure 3A:
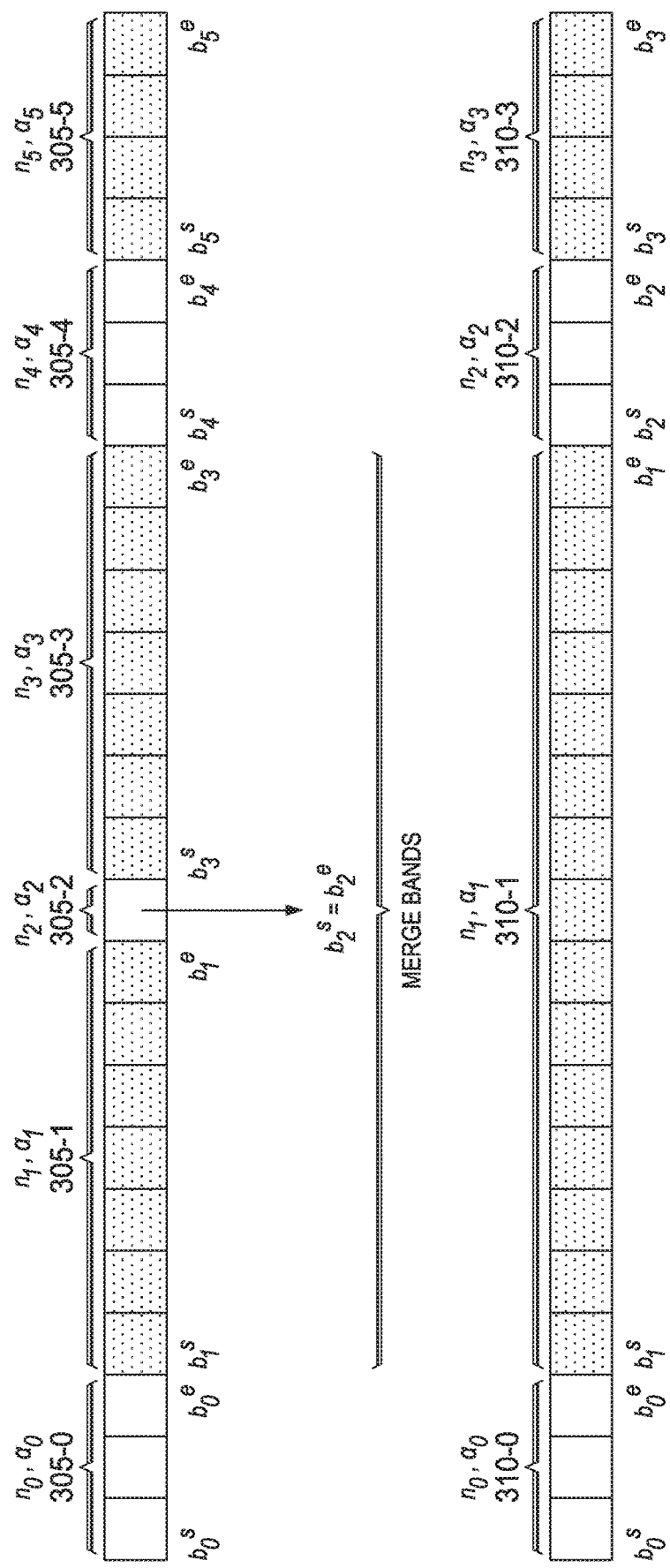
FIG. 3A depicts an example process for determining image bands according to an embodiment of this invention.
Figure 3B:
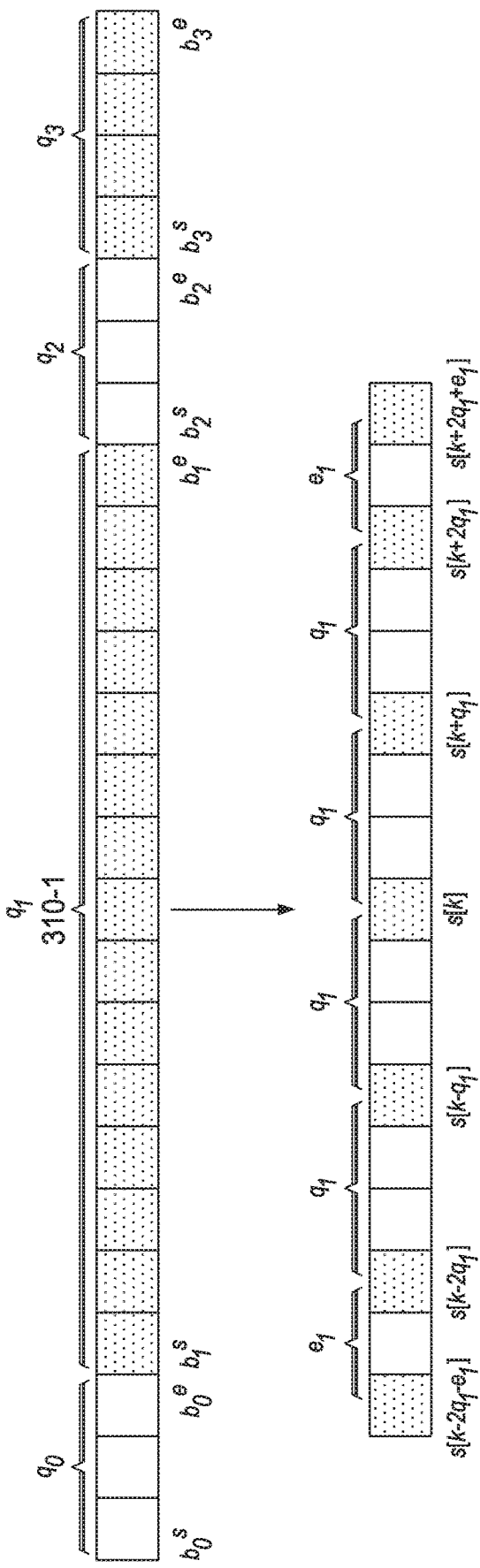
FIG. 3B depicts an example process to alleviate banding according to an embodiment of this invention.

An example of merging bands and performing adaptive sparse filtering according to an embodiment is depicted in FIG. 3A and FIG. 3B. As depicted in FIG. 3A, as an example, an analysis of the luminance pixels in a line buffer identified six bands (305-0 to 305-5), each one characterized by the number of pixels in the band ($n_j$), the band pixel value ($\alpha_i$), and the start ($b_i^s$) and end pixel positions ($b_i^e$) of each band, for j=0 to 5. Assuming that $n_2 < n_{tol}$, $|\alpha_2 - \alpha_1| \leq \alpha_{tol}$, and $\alpha_1 = \alpha_3$, bands 305-1, 305-2, and 305-3 may be merged into a single band (310-1), while, outside of renumbering them, the remaining bands remain as is. For example, band 310-0 has the same band characteristics (e.g., start, end, pixel band value, and width) as band 305-0, band 310-2 has the same band characteristics as band 305-4, and band 310-3 has the same band characteristics as band 305-5.

Following the merging of image bands (310-0 to 310-3), for each band, as depicted in step 215, the $q_i$ value of each band is determined using equation (5) for $W=n_j$, or $$q_i = m\left(\frac{n_j}{5}\right).$$

Then, as depicted in step 220, each band is filtered by the corresponding sparse filter. For example, the top part of FIG. 3A depicts that each band will be filtered with a filter using $q_i$ (i=0, 1, 2, and 3). The bottom part of FIG. 3B depicts an example of sparse filtering of the 310-1 band using the 7-tap ASF of equation (4), with $q=q_1$, and filter taps at s(k), $s(k \mp q_1)$, $s(k \mp 2q_1)$, and $s(k \mp (2q_1 + e_1))$.

Multi-Scan Adaptive Sparse Filtering

Figure 4:
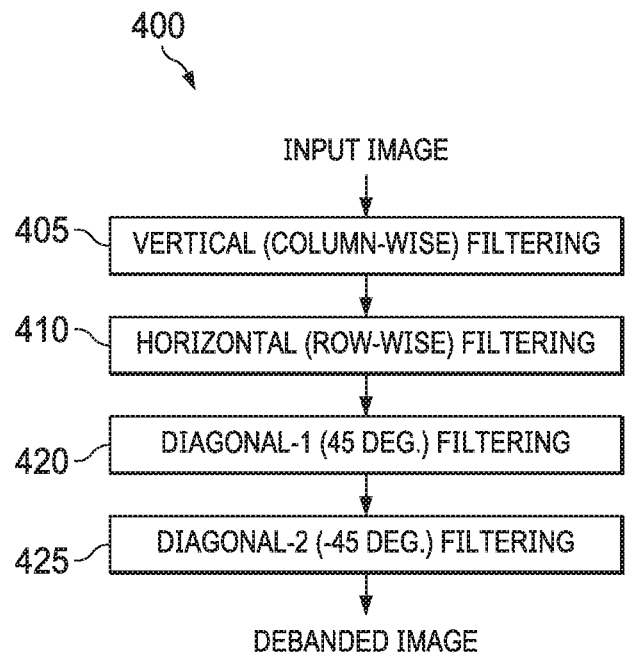
FIG. 4 depicts an example process to alleviate banding using multi-scan adaptive sparse filtering, according to an embodiment of this invention.
Figure 5:
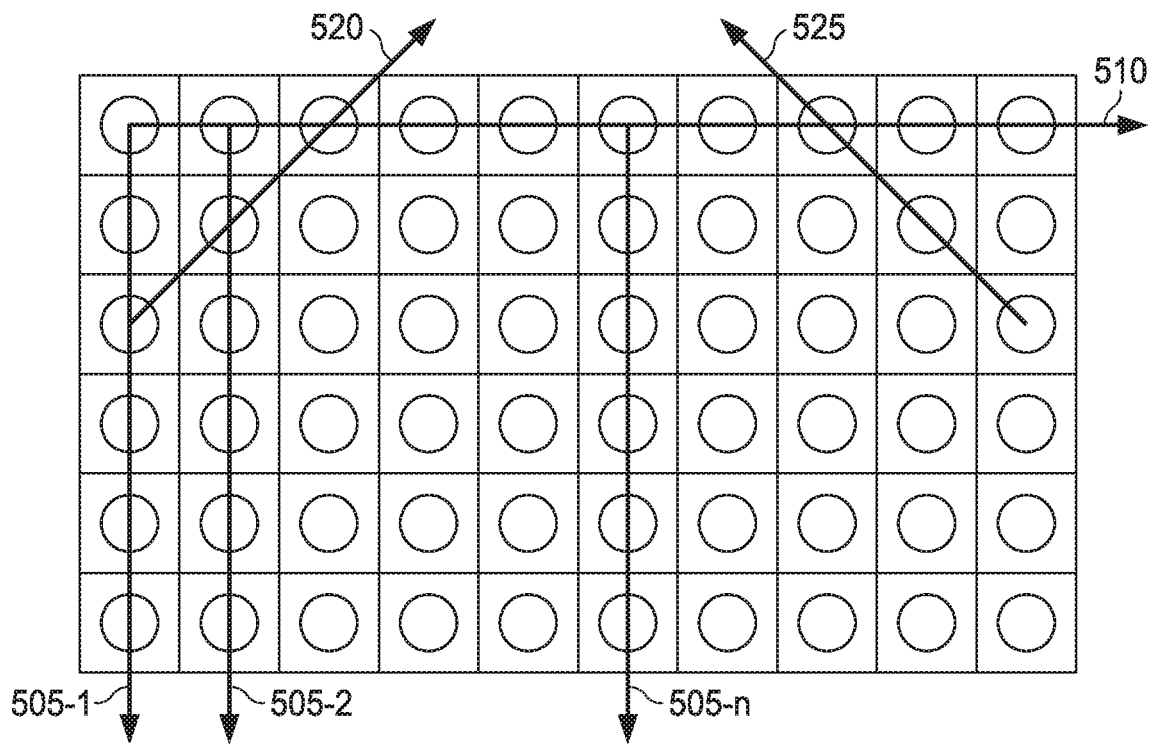
FIG. 5 depicts examples of multi-scan filtering orientations.

Given that images are two-dimensional, in some embodiments it may be preferable to apply sparse filtering across multiple dimensions, such as horizontally, vertically, and/or diagonally. An example process (400) for such an embodiment is depicted in FIG. 4. Without limitation, examples of filtering orientations are depicted in FIG. 5. As depicted in FIG. 4, debanding filtering may incorporate one or more applications of the original one-dimensional debanding process 200 across a variety of orientations, such as: vertical filtering (405) (across image columns 505), horizontal filtering (410) (across image rows 510), a first diagonal filtering (420) (say, across a 45-degrees angle 520), and a second diagonal filtering (425) (say, across a −45-degrees angle 525). Typically, debanding filtering is performed across the luma pixel components (e.g., Y, in YCbCr); however, the same filtering may be performed across any color component of any color space (e.g., RGB and the like), and across multiple color components. In some embodiments, filtering may be performed across only one, two, or three of the four orientations shown in FIG. 4, or even across other angle orientations (not shown).

Note that "bands" are redefined in each orientation; however, in multi-pass filtering, the output image of a one pass is used as the input image of the subsequent pass.

In multi-core or multi-thread systems, the debanding process may be parallelized. For example, in column-based filtering, multiple columns (e.g., 505-1, 505-2, ..., 505-n) may be filtered in parallel, each one using process 200, to expedite the processing time.

Iterative Multi-Scan Adaptive Sparse Filtering

In certain cases, generally, due to poor compression in certain regions (e.g., in the darks), one may still see visible banding even after applying the multi-scan filtering process (400) described earlier. In an embodiment, one way to address such content is by increasing the edge detection threshold Th of the ASF; however, such filtering may also remove necessary details, such as texture and edges. Alternatively, if one applies a second multi-scan ASF (MASF) pass on the output of a first multi-scan ASF pass, one may see images getting smoother, thus reducing banding artifacts further. Thus, running MASF iteratively may help in such images. In this section, an iterative MASF algorithm, which runs MASF repetitively until some operating conditions are met, is described.

Figure 6:
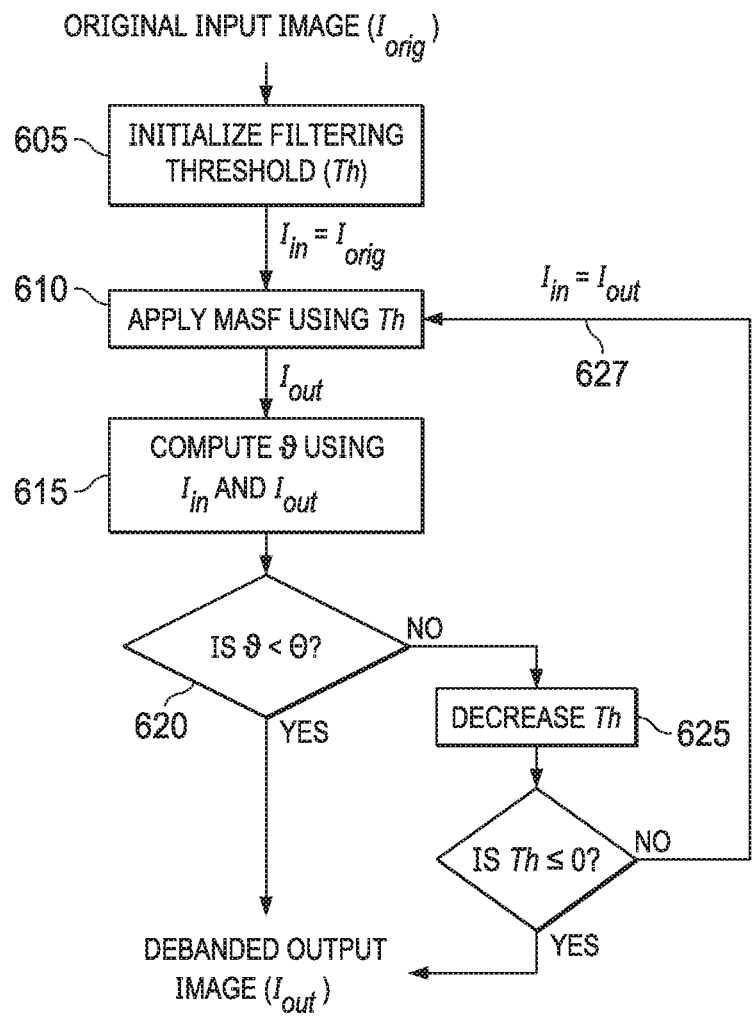
FIG. 6 depicts an example process to alleviate banding using an iterative multi-scan adaptive sparse filtering, according to an embodiment of this invention.

FIG. 6 depicts an example process for iterative multi-scan adaptive sparse filtering. Given an input image ($I_{orig}$), step 605 sets filtering-decision threshold Th (see equation (4)) to an initial value (e.g., Th=16). Next, step 610 applies the MASF algorithm (e.g., according to process 400) to generate the filtered image $I_{out}$. Let P denote the total number of pixels in the image. Let $I_{in}(i)$ and $I_{out}(i)$ be i-th luma pixel value of the input and the corresponding output image pixel of MASF in the current iteration. Then, in step 615, one computes θ, a measure of distortion between the two images. For example, without loss of generality, in an embodiment, one may compute the average sum of absolute differences (SAD) per pixel between $I_{in}$ and $I_{out}$ of the current iteration, computed as $$\theta = \frac{1}{P} \sum_{\forall i's} |I_{out}(i) - I_{in}(i)|. \quad (8)$$

In some embodiments, θ may be computed using alternative criteria, such as the mean-square error criterion and the like. Computing θ helps determine in step 620 whether to continue processing or not, by comparing it with threshold Θ. Threshold Θ may be determined empirically. If θ<Θ, then the output image is considered to be free of banding artifacts and the iterative process stops, otherwise, in step 625, the original filtering-decision threshold (Th) is reduced, but not to zero or below zero. For example, in an embodiment, the threshold is halved in each iteration, but alternative methods may be applied as well (e.g., by reducing Th by 1, 2, or a small integer value n). If there is no way to reduce the threshold Th, the process terminates, otherwise, $I_{in} = I_{out}$ (627) and the process continues with step 610 again.

As discussed, the iterative process is terminated when either of the following two conditions is first met:

θ<Θ: where Θ is a parameter indicating there is visually negligible change in pixel values; Using the SAD criterion of equation (8), experimental results show that Θ values of 0.1 or 0.2 yield satisfactory results.

Th≤0: This is equivalent to deciding that no pixel values have changed after filtering.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to reducing banding artifacts, such as those described herein. The computer and/or IC may compute, any of a variety of parameters or values that relate to reducing banding artifacts as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement reducing banding artifacts methods as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to reducing banding artifacts for images are thus described. In the foregoing specification, embodiments of the present invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

1. In an encoder or a decoder comprising one or more processors, a method for reducing banding artifacts, the method comprising:
  receiving an input image comprising pixel values (205);
  receiving a filtering decision threshold;
  generating a one-dimensional pixel array based on the pixel values of the input image;
  generating (210) one or more image bands based on the pixel values in the one-dimensional pixel array, wherein an image band in the one or more image bands is characterized by a starting position in the one-dimensional pixel array, an ending position in the one-dimensional pixel array or a width of the band, and a band pixel value;
  for an image band in the one or more image bands:
    determining (215) a tap-distance parameter for a sparse filter based on the width of the image band; and
    applying (220) the sparse filter with the tap-distance parameter and the filtering decision threshold to the image band to generate output filtered pixel values; and
  generating an output image based on the output filtered pixel values.

2. The method of EEE 1, wherein generating the one-dimensional pixel array comprises sampling pixels values of a color component of the input image across one of: a row of the input image, a column of the input image, a 45-degrees diagonal direction of the input image, or a −45 degrees diagonal direction of the input image.

3. The method of EEE 1 or EEE 2, wherein generating the j-th image band among the one or more image bands comprises detecting that for $k=b_j^{start}, b_j^{start}+1, b_j^{start}+2, \ldots, b_j^{end}$ $s(k)=\alpha_j;$ $s(b_j^{start}-1) \neq \alpha_j;$ and $s(b_j^{end}+1) \neq \alpha_j,$ where $s(k)$ denotes a pixel value in the k-th position of the one-dimensional pixel array, $b_j^{start}$ denotes the starting position of the j-th image band in the one-dimensional pixel array, $b_j^{end}$ denotes the ending position of the j-th image band in the one-dimensional pixel array, and $\alpha_j$ denotes the band pixel value for the j-th image band.

4. The method of EEE 3, wherein given three consecutive image bands, band j, j+1, and j+2, among the one or more image bands, the three consecutive image bands are merged into one band, if $n_{j+1} n_{tol}, |\alpha_j - \alpha_{j+1}| \leq \alpha_{tol},$ and $\alpha_j = \alpha_{j+2},$ where $n_{tol}$ and $\alpha_{tol}$ are thresholds, and $n_1$ denotes the width of the j-th image band.

5. The method of any of the EEEs 1-4, wherein, for the j-th image band, the width of the image band is determined as $n_j = b_j^{end} - b_j^{start} + 1,$ where, $n_j$ denotes the width of the j-th image band, $b_j^{start}$ denotes the starting position of the j-th image band in the one-dimensional pixel array, and $b_j^{end}$ denotes the ending position of the j-th image band in the one-dimensional array.

6. The method of any of EEEs 1-5, wherein generating the output filtered pixel values comprises computing:

$s'(k) = \sum_{i=-u}^{u} w_i s(k+d[i]),$ where $w_i$ denotes the i-th filter coefficient, $s(k)$ denotes the k-th pixel value in the image band, $s'(k)$ denotes the k-th output filtered pixel value, $d[i]$ denotes a tap-distance for the i-th tap, and $2u+1$ denotes the number of filter taps.

7. The method of EEE 6, wherein $d[i]=i*q$, wherein q denotes the tap-distance parameter for the sparse filter.

8. The method of EEE 7, wherein $$q = m \frac{w}{(2u-1)},$$

where m is an integer constant smaller than $2u-1$, and W denotes the width of the image band filtered by the sparse filter.

9. The method of EEE 6 or EEE 7, further comprising computing:

$D_k^{(i)} = s(k) - s(k+d[i]),$ for $i=-u$ to $u,$ $D_k^{(max)} = \max(|D_k^{(i)}|),$ for $i=-u$ to $u,$ if $(D_k^{(max)} \leq Th)$ $s'[k] = \sum_{i=-u}^{u} w_i s(k+d[i]),$ else $s'[k] = s[k]$ where Th denotes the filtering decision threshold.

10. The method of EEE 9, wherein $w_u = w_{-u} = 0,$ $d[u] = (u-1)*q+e;$ and $d[-u] = -(u-1)*q-e;$ for $i=-u+1$ to $u-1$:

$w_i = 1/(2u-1);$ and $d[i] = iq;$ where q and e are constants.

11. The method of EEE 10, wherein $$e = \frac{q-1}{2}$$

if q is odd and $$e = \frac{q}{2}$$

if q is even.

12. In a system comprising one or more processors, a method for reducing banding artifacts, the method comprising:
  receiving an input image comprising pixel values;
  filtering the input image using adaptive sparse filtering according to the method of any of EEEs 1-11 to generate a first output image, wherein the adaptive sparse filtering is performed across columns of the input image; and filtering the first output image using adaptive sparse filtering according to the method of any of EEEs 1-11 to generate a second output image, wherein the adaptive sparse filtering is performed across rows of the first output image.

13. The method of EEE 12, further comprising:
filtering the second output image using adaptive sparse filtering according to the method of any of EEEs 1-11 to generate a third output image, wherein the adaptive sparse filtering is performed across a 45-degrees diagonal of the second output image; and
filtering the third output image using adaptive sparse filtering according to the method of any of EEEs 1-11 to generate a fourth output image, wherein the adaptive sparse filtering is performed across a −45-degrees diagonal of the third output image.

14. In a system comprising one or more processors, a method for reducing banding artifacts, the method comprising:
receiving an input image comprising pixel values;
receiving a first threshold parameter;
using the first threshold parameter as the filtering decision threshold to filter the input image using adaptive sparse filtering according to the method of any of EEEs 1-11 to generate a first output image;
computing an image distance metric between the input image and the first output image according to an image-distance criterion;
comparing the image distance metric with a continuation threshold, and
if the image distance metric is larger than the continuation threshold, then
  decreasing the first threshold parameter to generate a second threshold parameter; and
  using the second threshold parameter as the filtering decision threshold to filter the first output image using adaptive sparse filtering according to the method of any of EEEs 1-11 to generate a second output image;
else outputting the first output image.

15. The method of EEE 14, wherein the image distance metric comprises computing an average sum of absolute differences between pixel values of the input image and pixel values of the first output image.

16. A non-transitory computer-readable storage medium having stored thereon computer-executable instructions for executing with one or more processors a method in accordance with any one of the methods recited in EEEs 1-15.

17. An apparatus comprising a processor and configured to perform any one of the methods recited in EEEs 1-15.

The invention claimed is:

1. A method for reducing banding artifacts, the method comprising:
receiving an input image comprising pixel values;
identifying one or more sequence of pixels having the same pixel value between a starting position and an end position in a one dimensional pixel array of the input image, to identify corresponding one or more image bands in the one-dimensional pixel array, wherein an image band in the one or more image bands is characterized by a width of the band defined as the number of pixels of the same value between the starting position and ending position, and a band pixel value;
for each image band in the one or more image bands:
  determining, for a sparse filter, a tap-distance parameter, indicating a number of consecutive pixels between a pixel of a center-tap of the sparse filter and a pixel of a neighboring tap, as a function of the width of the image band, wherein the determined tap-distance parameter is directly proportional to the width of the image band; and
  applying the sparse filter with the tap-distance parameter to the image band to generate output filtered pixel values; and
generating an output image based on the output filtered pixel values.

2. The method of claim 1, wherein the number of taps of the sparse filter is predetermined.

3. The method of claim 2, wherein applying the filter with the tap-distance parameter to a pixel of the image band comprises averaging the pixel values of the corresponding taps over the predetermined number of taps.

4. The method of claim 3, wherein the averaging excludes the pixel values of boundary taps located at boundaries of the sparse filter.

5. The method of claim 1, further comprising:
receiving a filtering decision threshold;
for each image band:
  computing a plurality of differences between a pixel value of the center tap and each pixel value of the other taps,
  computing the absolute maximum of the differences, wherein the sparse filter is applied to the image band based on a comparison between the filtering decision threshold and the absolute maximum.

6. The method of claim 5, wherein the sparse filter is applied to the image band if the absolute maximum does not exceed the filtering decision threshold.

7. The method of claim 1, wherein identifying one or more sequence of pixels having the same pixel value in the one-dimensional pixel array comprises analyzing pixels values of a color component of the input image across one of: a row of the input image, a column of the input image, a 45-degrees diagonal direction of the input image, or a −45 degrees diagonal direction of the input image.

8. The method of claim 1, wherein identifying one or more sequence of pixels having the same pixel values comprises detecting that for $k=b_j^{start}, b_j^{start}+1, b_j^{start}+2, \ldots, b_j^{end}$ $s(k)=\alpha_j;$ $s(b_j^{start}-1) \neq \alpha_j;$ and $s(b_j^{end}+1) \neq \alpha_j,$ where s(k) denotes a pixel value in the k-th position of the one-dimensional pixel array, $b_j^{start}$ denotes the starting position of the j-th image band in the one-dimensional pixel array, $b_j^{end}$ denotes the ending position of the j-th image band in the one-dimensional pixel array, and $\alpha_j$ denotes the band pixel value for the j-th image band.

9. The method of claim 8, wherein given three consecutive image bands, band j, j+1, and j+2, among the one or more image bands, the three consecutive image bands are merged into one band, if $n_{j+1} n_{tol}, |\alpha_j - \alpha_{j+1}| \leq \alpha_{tol},$ and $\alpha_j = \alpha_{j+2},$ where $n_{tol}$ and $\alpha_{tol}$ are thresholds, and $n_j$ denotes the width of the j-th image band.

10. The method of claim 1, wherein, for the j-th image band, the width of the image band is determined as $n_j = b_j^{end} - b_j^{start} + 1,$ where, $n_j$ denotes the width of the j-th image band, $b_j^{start}$ denotes the starting position of the j-th image band in the one-dimensional pixel array, and $b_j^{end}$ denotes the ending position of the j-th image band in the one-dimensional array.

11. The method of claim 1, wherein generating the output filtered pixel values comprises computing:

$$s'(k)=\Sigma_{i=-u}^{u} w_i s(k+d[i]),$$

where $w_i$ denotes the i-th filter coefficient, s(k) denotes the k-th pixel value in the image band, s'(k) denotes the k-th output filtered pixel value, d[i] denotes a tap-distance for the i-th tap from the center tap, and 2u+1 denotes the number of filter taps.

12. The method of claim 11, wherein d[i]=i*q, for i=−u+1 to i=u+1, wherein q denotes the tap-distance parameter for the sparse filter.

13. The method of claim 12, wherein $$q = m\frac{w}{(2u-1)},$$

where m is an integer constant smaller than 2u−1, and W denotes the width of the image band filtered by the sparse filter.

14. The method of claim 5, further comprising computing:

$$D_k^{(i)}=s(k)-s(k+d[i]), \text{ for } i=-u \text{ to } u,$$

$$D_k^{(max)}=\max(|D_k^{(i)}|), \text{ for } i=-u \text{ to } u,$$

if $(D_k^{(max)} \leq Th)$ $$s'[k]=\Sigma_{i=-u}^{u} w_i s(k+d[i]),$$

else $$s'[k]=s[k]$$

where Th denotes the filtering decision threshold, $D_k^{(i)}$ denotes the plurality of differences and $D_k^{(max)}$ denotes the absolute maximum of the differences.

15. The method of claim 14, wherein $$w_u=w_{-u}=0,$$

$$d[u]=(u-1)*q+e; \text{ and}$$

$$d[-u]=-(u-1)*q-e;$$

for $i=-u+1$ to $u-1$:

$$w_i=1/(2u-1); \text{ and}$$

$$d[i]=iq;$$

where q and e are constants, wherein $$e = \frac{q-1}{2}$$

if q is odd and $$e = \frac{q}{2}$$

if q is even.

16. The method of claim 1, wherein the method is performed across columns of the input image to generate a first output image and wherein the method is performed across rows of the first output image to generate a second output image.

17. The method of claim 16, wherein the method is performed across a 45-degrees diagonal of the second output image to generate a third output image and wherein the method is performed across a −45-degrees diagonal of the third output image to generate a fourth output image.

18. The method of claim 5, further comprising:
computing an image distance metric between the input image and the output image according to an image-distance criterion;
comparing the image distance metric with a continuation threshold, and
if the image distance metric is larger than the continuation threshold, then
decreasing the filtering decision threshold to generate a second filtering decision threshold; and
using the second filtering decision threshold to filter the output image according to the method of claim 1 to generate a second output image;
else outputting the output image.

19. The method of claim 18, wherein computing the image distance metric comprises computing an average sum of absolute differences between pixel values of the input image and pixel values of the output image.

20. A non-transitory computer-readable storage medium having stored thereon computer-executable instructions that when executed with one or more processors, cause the one or more processors to perform a method in accordance with any one of the claims recited in claim 1.

* * * * *